United States Patent
Xing et al.

(10) Patent No.: US 11,521,154 B2
(45) Date of Patent: Dec. 6, 2022

(54) PACKAGE PLACEMENT METHOD, PACKAGE PLACEMENT CONTROL APPARATUS AND PACKAGE PLACEMENT DEVICE

(71) Applicant: SHANGHAI QUICKTRON INTELLIGENT TECHNOLOGY CO., LTD, Shanghai (CN)

(72) Inventors: Leilei Xing, Shanghai (CN); Run Huang, Shanghai (CN); Wei Huang, Shanghai (CN); Fei Ni, Shanghai (CN)

(73) Assignee: SHANGHAI QUICKTRON INTELLIGENT TECHNOLOGY CO., LTD, Shanghai (CN)

( * ) Notice: Subject to any disclaimer, the term of this patent is extended or adjusted under 35 U.S.C. 154(b) by 0 days.

(21) Appl. No.: 17/426,801

(22) PCT Filed: Apr. 19, 2019

(86) PCT No.: PCT/CN2019/083389
§ 371 (c)(1),
(2) Date: Jul. 29, 2021

(87) PCT Pub. No.: WO2019/134718
PCT Pub. Date: Jul. 11, 2019

(65) Prior Publication Data
US 2022/0083952 A1 Mar. 17, 2022

(30) Foreign Application Priority Data
Apr. 2, 2019 (CN) .......................... 201910261400.0

(51) Int. Cl.
*G06Q 10/08* (2012.01)
(52) U.S. Cl.
CPC ................................ *G06Q 10/083* (2013.01)

(58) Field of Classification Search
CPC .................................................. G06Q 10/083
See application file for complete search history.

(56) References Cited

U.S. PATENT DOCUMENTS

| 10,048,697 B1* | 8/2018 | Theobald ............. G05D 1/0088 |
| 2013/0325208 A1* | 12/2013 | Osagawa ............. G05D 1/0212 701/25 |
| 2016/0304281 A1 | 10/2016 | Elazary et al. |

FOREIGN PATENT DOCUMENTS

| CN | 1836247 | 9/2006 |
| CN | 203237665 | 10/2013 |

(Continued)

OTHER PUBLICATIONS

De Lemos Miranda, Luis Filipe, Analysis and Simulation of AGVS Routing Strategies Using V-REP, Universidade do Porto, 2017.*

(Continued)

*Primary Examiner* — Nathan Erb
(74) *Attorney, Agent, or Firm* — Dority & Manning, P.A.

(57) ABSTRACT

Disclosed are a package placement method and apparatus, the method comprising: obtaining an obstacle distribution of placement areas adjacent to a target placement area, each placement area being correspondingly provided with a package storage apparatus; according to the obstacle distribution, determining a movement direction for a conveying platform to enter the target placement area, the conveying platform being used for placing a package in the package storage apparatus; according to the movement direction for the conveying platform, determining a package placement means; according to the determined package placement means, placing the package in the package storage apparatus corresponding to the target placement area. The package placement means is determined according to the obstacle distribution, and the conveying platform is controlled to move and place the package, thereby saving placement time, (Continued)

eliminating conveying platform stopping and restarting time, and increasing placement efficiency.

15 Claims, 12 Drawing Sheets

(56) References Cited

FOREIGN PATENT DOCUMENTS

| CN | 107045677 | | 8/2017 | | |
|---|---|---|---|---|---|
| CN | 206527060 | | 9/2017 | | |
| CN | 206527060 U | * | 9/2017 | ............... | B07C 3/18 |
| CN | 107225580 | | 10/2017 | | |
| CN | 108401423 | | 8/2018 | | |
| CN | 108861427 | | 11/2018 | | |
| CN | 108971003 | | 12/2018 | | |
| CN | 208245210 | | 12/2018 | | |
| DE | 102017003545 | | 1/2018 | | |

OTHER PUBLICATIONS

International Search Report (w/ English Translation) for corresponding PCT Application No. PCT/CN2019/083389 dated Jan. 3, 2020, 11 pages.
First Chinese Office Action (w/ English Translation) for corresponding Chinese Application No. 2011910261400.0, 17 pages.
Second Chinese Office Action (w/ English Translation) for corresponding Chinese Application No. 201910231400.0, 19 pages.
Chinese Notification to Grant Patent Right for Invention (w/ English Translation) for corresponding Chinese Application No. 201910261400.0, 6 pages.

* cited by examiner

PACKAGE PLACEMENT METHOD, PACKAGE PLACEMENT CONTROL APPARATUS AND PACKAGE PLACEMENT DEVICE

CROSS-REFERENCE TO RELATED APPLICATIONS

This application is a National Stage application of PCT international application PCT/CN2019/083389 filed on Apr. 19, 2019, which claims priority to Chinese Patent Application No. 201910261400.0 filed on Apr. 2, 2019, both of which are incorporated herein by reference in their entireties for all purposes.

The present application claims priority to Chinese Patent Application No. 201910261400.0, submitted to the Chinese Patent Office on Apr. 2, 2019, entitled "Package Placement Method, Package Placement Control Apparatus and Package Placement Device", which is incorporated herein by reference in its entirety.

TECHNICAL FIELD

The present application relates to a technical field of package delivering, in particular to a package delivering method, a package delivering control device and a package delivering apparatus.

BACKGROUND

In streamline work such as package sorting, package delivering and the like, performing the streamline work by robots can greatly reduce time-consuming and labor costs, and thus improve working efficiency. In order to improve working efficiency, a robot is often required to deliver packages during movement. However, in a hot zone with much work to be done, more robots work in the zone, and it cannot be guaranteed that the robots could deliver the packages during a high speed movement if there is a jam or a malfunctioning robot. In such a situation, a package can be delivered only if a normal robot locates beside a corresponding package storage device, which results in slow delivering speed and low working efficiency.

SUMMARY

Embodiments of the present application provide a package delivering method, a package delivering control device and package delivering apparatus, and aim to solve at least the above technical problem in the prior art.

In a first aspect, according to an embodiment of the application, a package delivering method is provided, which may include:

acquiring obstacle distribution of a delivering zone adjacent to a target delivering zone, wherein each delivering zone corresponds to a package storage device;

determining a movement direction of a transfer table entering the target delivering zone according to the obstacle distribution, wherein the transfer table is used for delivering a package into the package storage device;

determining a package delivering mode according to the movement direction of the transfer table; and delivering the package into the package storage device corresponding to the target delivering zone according to the determined package delivering mode.

With reference to the first aspect, according to a first embodiment in the first aspect of the present application, the determining the movement direction of the transfer table entering the target delivering zone according to the obstacle distribution, including:

in a case that there is an obstacle in one of the delivering zones adjacent to the target delivering zone, determining the movement direction of the transfer table entering the target delivering zone to be a direction parallel to the package storage device.

With reference to the first embodiment in the first aspect, according to a second embodiment of the present application, the determining the package delivering mode according to the movement direction of the transfer table, including:

in a case that the movement direction of the transfer table is the direction parallel to the package storage device, determining the package delivering mode to be a linear delivering mode.

With reference to the second embodiment in the first aspect, according to a third embodiment of the present application, delivering the package into the package storage device according to the determined package delivering mode, including:

acquiring a limited acceleration and a speed of the transfer table when the transfer table moves linearly;

calculating a braking distance of the transfer table according to a delivering time of the package delivered from the transfer table to the package storage device, the limited acceleration and the speed; and delivering the package into the package storage device during controlling the transfer table to move along the braking distance.

With reference to the first aspect, accordion to a fourth embodiment of the present application, the determining the movement direction of the transfer table entering the target delivering zone according to the obstacle distribution, including:

in a case that there are obstacles in two delivering zones adjacent to the target delivering zone, determining the movement direction of the transfer table entering the target delivering zone to be a direction perpendicular to the package storage device.

With reference to a fourth embodiment in the first aspect, according to a fifth embodiment of the present application, the determining the package delivering mode according to the movement direction of the transfer table, including:

in a case that the movement direction of the transfer table is the direction perpendicular to the package storage device, determining the package delivering mode to be a rotary delivering mode.

With reference to the fifth embodiment in the first aspect, the delivering the package into the package storage device according to the determined package delivering mode, including:

acquiring a limited angular acceleration and an angular speed of the transfer table when the transfer table rotates;

calculating a rotation distance of the transfer table according to the delivering time of the package delivered from the transfer table to the package storage device, the limited angular acceleration and the angular speed; and delivering the package into the package storage device during controlling the transfer table to rotate along the rotation distance.

With reference to a third embodiment or a sixth embodiment in the first aspect, according to a seventh embodiment of the present application, the delivering time of the package delivered from the transfer table to the package storage device is acquired by:

detecting whether the package enters the transfer table or not, if so, transferring the package having entered the transfer table to a delivering position on the transfer table, at a transfer speed;

measuring a vertical distance between the delivering position and the package storage device; and calculating the delivering time according to the transfer speed and the vertical distance.

In a second aspect, an embodiment of the present application provides a package delivering control device, which may include:

an obstacle detection module configured for acquiring an obstacle distribution of a delivering zone adjacent to a target delivering zone, wherein each delivering zone corresponds to a package storage device;

a movement direction determination module configured for determining a movement direction of the transfer table entering the target delivering zone according to the obstacle distribution;

a package delivering mode determination module configured for determining a package delivering mode according to the movement direction of the transfer table; and a package delivering module configured for delivering the package into the package storage device corresponding to the target delivering zone according to the determined package delivering mode.

According to a first embodiment with reference to a second aspect of the present application, the movement direction determination module may include:

a parallel direction determination unit configured for determining the movement direction of the transfer table entering the target delivering zone to be a direction parallel to the package storage device, in a case that there is an obstacle in one of the delivering zones adjacent to the target delivering zone.

With reference to the first embodiment in the second aspect, according to the second embodiment of the present application, the package delivering mode determination module may include:

a linear delivering mode determination unit configured for determining the package delivering mode to be a linear delivering mode in a case that the movement direction of the transfer table is the direction parallel to the package storage device.

With reference to the second embodiment in the second aspect, according to a third embodiment of the present application, the package delivering module may include:

a linear movement data acquisition unit configured for acquiring a limited acceleration and a speed of the transfer table when the transfer table moves linearly;

a braking distance calculation unit configured for calculating a braking distance of the transfer table according to a delivering time of the package delivered from the transfer table to the package storage device, the limited acceleration and the speed; and a first delivering control unit configured for delivering the package into the package storage device during controlling the transfer table to move along the braking distance.

With reference to the second aspect, according to a fourth embodiment of the present application, the movement direction determination module may include:

a vertical direction determination unit configured for determining the movement direction of the transfer table entering the target delivering zone to be a direction perpendicular to the package storage device, in a case that there are obstacles in two delivering zones adjacent to the target delivering zone.

With reference to the fourth embodiment in the second aspect, according to a fifth embodiment of the present application, the package delivering mode determination module may further include:

a rotary delivering mode determination unit configured for determining the package delivering mode to be a rotary delivering mode, in a case that the movement direction of the transfer table is the direction perpendicular to the package storage device.

With reference to the fifth embodiment in the second aspect, according to a sixth embodiment of the present application, the package delivering module may further include:

a rotary movement data acquisition unit configured for acquiring a limited angular acceleration and an angular speed of the transfer table when the transfer table rotates;

a rotation distance calculation unit configured for calculating a rotation distance of the transfer table according to the delivering time of the package delivered from the transfer table to the package storage device, the limited angular acceleration and the angular speed; and a second delivering control unit configured for delivering the package into the package storage device during controlling the transfer table to rotate along the rotation distance.

With reference to the third embodiment or the sixth embodiment in the second aspect, according to a seventh embodiment of the present application, the package delivering module may further include:

a first sensor arranged at a feeding port of the transfer table and configured for detecting whether the package enters the transfer table;

a second sensor arranged at the delivering position on the transfer table and configured for detecting whether the package enters the delivering position;

a package transfer controller configured for transferring the package having entered the transfer table to the delivering position at a transfer speed;

a measurer configured for measuring a vertical distance between the delivering position and the package storage device; and a delivering time calculator configured for calculating the delivering time according to the transfer speed and the vertical distance.

In a third aspect, the embodiment of the application provides a package delivering apparatus, which may include a moving base, a stand column, a transfer table and a package delivering control device according to any one of the above package delivering control devices;

wherein, an upper end and a lower end of the stand column are respectively connected with the transfer table and the moving base, and the transfer table is used for delivering the package into the package storage device.

One of the above technical solutions has the following advantages or beneficial effects: in the embodiments of the present application, a package delivering mode is determined according to the obstacle distribution, and the delivering table is controlled to deliver while moving, such that not only the delivering time is saved, but also the braking time and the restarting time of the delivering table are saved, and thus the delivering efficiency is improved.

The foregoing summary is for the purpose of description only and is not intended to be limiting in any way. In addition to the illustrative aspects, embodiments, and features described above, further aspects, embodiments, and features of the present application will become readily apparent by reference to the drawings and the following detailed description.

BRIEF DESCRIPTION OF THE DRAWINGS

In the drawings, like reference numerals refer to the same or similar parts or elements throughout several figures unless otherwise specified. The drawings are not necessarily to scale. It is to be understood that these drawings depict only some embodiments in accordance with the present disclosure and are not to be construed as limiting to the scope of the present application.

DETAILED DESCRIPTION

In the following, only certain exemplary embodiments are briefly described. As will be appreciated by a person skilled in the art, the described embodiments may be modified in various ways without departing from the spirit or scope of the present application. Accordingly, the drawings and description are to be construed as illustrative but not limiting in nature.

Embodiment 1

Figure 1:
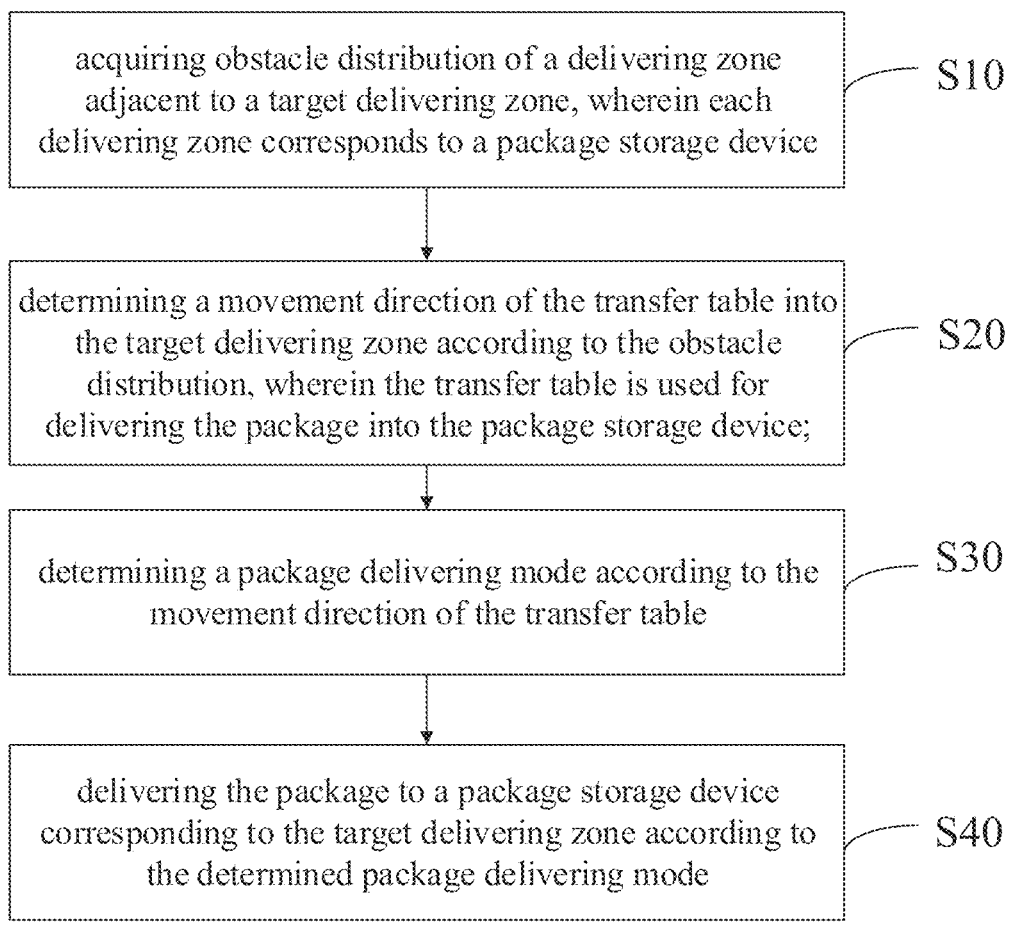
FIG. 1 is a schematic flow diagram of a package delivering method according to an embodiment of the present application.

In a particular embodiment, as shown in FIG. 1, the present application provides a package delivering method, which may include:

S10: acquiring obstacle distribution of a delivering zone adjacent to a target delivering zone, wherein each delivering zone corresponds to a package storage device;

S20: determining a movement direction of a transfer table entering the target delivering zone according to the obstacle distribution, wherein the transfer table is used for delivering a package into the package storage device;

S30: determining a package delivering mode according to the movement direction of the transfer table; and S40: delivering the package into the package storage device corresponding to the target delivering zone according to the determined package delivering mode.

In an example, a plurality of package storage devices are arranged longitudinally in a plurality of rows with a plurality of delivering zones being disposed between two adjacent rows of package storage devices, each delivering zone corresponding to a package storage device. It is to be noted that the number and distribution positions of the package storage devices in each row may be adjusted as required. In order to facilitate the delivering of materials such as packages, the position of the package storage devices in each row may not correspond to the position of the package storage devices in adjacent rows one by one, and as for the package storage devices in one row, there may be no corresponding package storage devices in the another row which is opposite to the one row. An obstacle in the delivering zone may be a malfunctioning transfer table for delivering a package into a package storage device. The transfer table can be arranged on the package delivering device which can be a movable package sorting robot, a discharge port of the transfer table is always positioned above the package storage device in a process of moving and delivering the packages to guarantee a successful delivering of all the packages without delivering the packages outside. The package storage device can be a cage vehicle, an electronic tag can be arranged on the surface of the cage vehicle, and whether packages in the cage vehicle are transported away or not can be conveniently determined by scanning the electronic tag.

Figure 2:
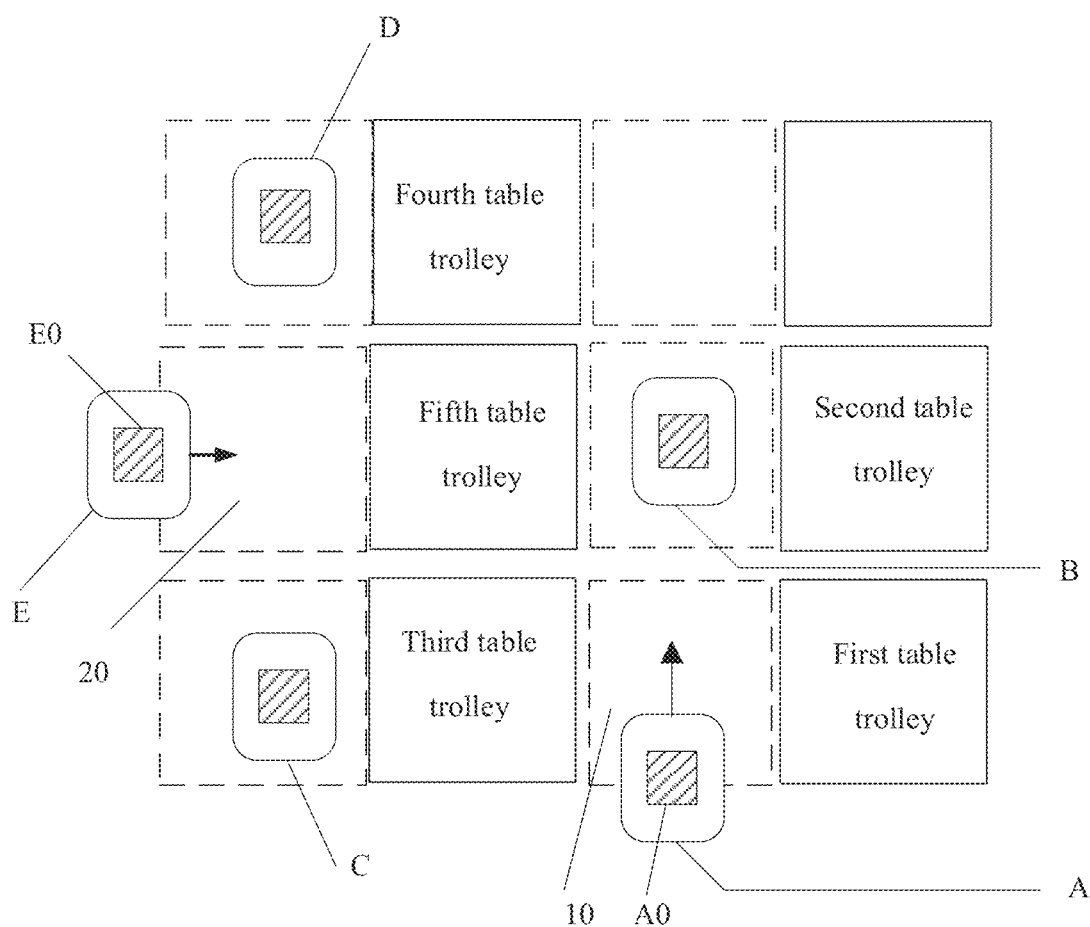
FIG. 2 is a schematic view which shows a package sorting robot delivering packages to a cage vehicle according to an embodiment of the present application.

The obstacle distribution can be as in a first case which is shown in FIG. 2, and a malfunctioning package sorting robot B stops in a delivering zone corresponding to the second cage vehicle, so that a package sorting robot A from the first cage vehicle stops delivering after detecting an obstacle in front of it, or the package sorting robot A firstly determines that it stops in a delivering zone corresponding to the first cage vehicle and then it starts delivering, and after the delivering, the package sorting robot A may be restarted to leave the current delivering zone. The obstacle distribution may also be as in a second case which is shown in FIG. 2, wherein the malfunctioning package sorting robot C stops in a delivering zone corresponding to the third cage vehicle, a malfunctioning package sorting robot D stops in a delivering zone corresponding to a fourth cage vehicle, and a fifth cage vehicle is positioned between the third cage vehicle and the fourth cage vehicle, so that the package sorting robot E can only perform delivering after entering the delivering zone in a direction perpendicular to the fifth cage vehicle. Due to different obstacle distributions, the package sorting robots enter the target delivering zones in different movement directions. In the first case described above, the package sorting robot A normally enters the first target delivering zone 10 in a direction parallel to the cage vehicle, and in the second case, the package sorting robot E can only enters the second target delivering zone 20 in a direction perpendicular to the cage vehicle. In the two cases, the movement directions of the package sorting robots are different, and the package delivering modes thereof are also different. In the first case, the package sorting robot A moves along each cage vehicle, and is controlled to move along the first cage vehicle after entering the first target delivering zone 10, and the transfer table AO on the package sorting robot A simultaneously delivers the package to the first cage vehicle. In the second case, after a package sorting robot E enters the second target delivering zone 20, since the movable space is small, the package sorting robot E cannot move as in the first case, the packages can be delivered by rotating the transfer table E0, and finally the packages are smoothly delivered into a fifth cage vehicle. A package delivering mode is determined according to the obstacle distribution, a transfer table is controlled to deliver the packages while moving, so that not only the delivering time is saved, but also the braking time and restarting time of the transfer table are saved, and thus the delivering efficiency is improved.

Figure 3:
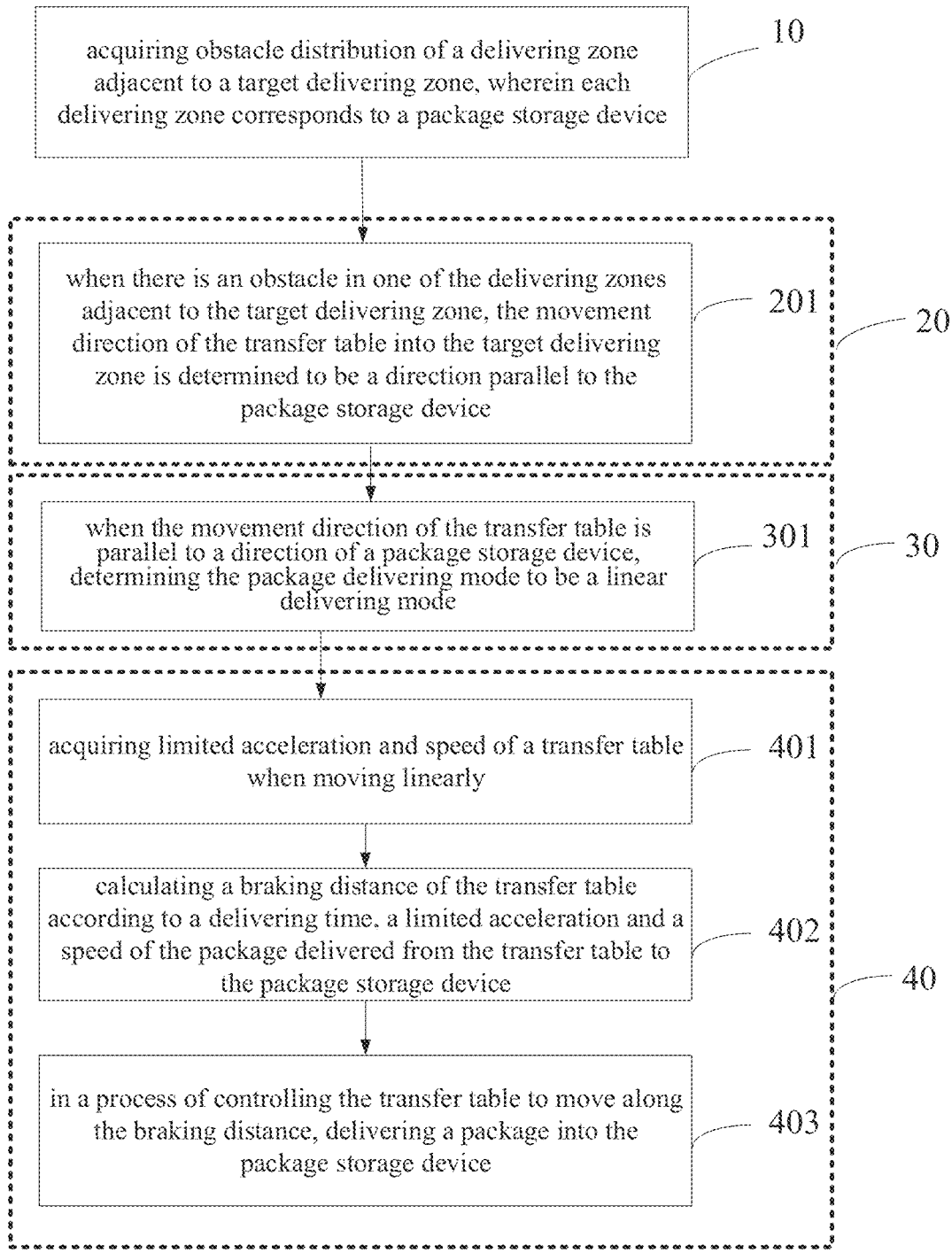
FIG. 3 is a schematic flow diagram of another package delivering method according to an embodiment of the present application.

In an embodiment, as shown in FIG. 3, S20 may include:

S201: in a case that there is an obstacle in one of the delivering zones adjacent to the target delivering zone, determining the movement direction of the transfer table entering the target delivering zone to be a direction parallel to the package storage device.

In an example, to facilitate determination of a package delivering mode, the movement direction of a package delivering device provided with a transfer table may be determined while an obstacle is detected. If the package delivering device moves along the direction parallel to the package storage device, when an obstacle is detected in the adjacent delivering zone of the front target delivering zone, the package delivering device keeps moving along a direction parallel to the package storage device. As shown in FIG. 2, the first cage vehicle corresponds to a target delivering zone, the first cage vehicle is adjacent to a second cage vehicle, and the delivering zone corresponding to the second cage vehicle is one of the delivering zones adjacent to the target delivering zone. The package sorting robot A moves in a direction parallel to a row in which the first cage vehicle is located.

In an embodiment, as shown in FIG. 3, S30 may include:

S301: in a case that the movement direction of the transfer table is the direction parallel to the package storage device, determining the package delivering mode to be a linear delivering mode.

In an example, the linear delivering mode means that when the package sorting robot provided with the transfer table moves linearly, packages are delivered while the robot is moving. Thus, the delivering time can be effectively saved, the time for braking and restarting the package delivering device are saved, and the delivering efficiency is improved.

In an embodiment, as shown in FIG. 3, S40 may include:

S401: acquiring a limited acceleration and a speed of the transfer table when the transfer table moves linearly;

S402: calculating a braking distance of the transfer table according to a delivering time of the package delivered from the transfer table to the package storage device, the limited acceleration and the speed; and S403: delivering the package into the package storage device during controlling the transfer table to move along the braking distance.

In an example, as a transfer table is disposed on the package delivering device, the transfer table moves linearly, i.e., the package delivering device moves linearly. The delivering time may indicate the time of all packages on the transfer table moving to an edge of the transfer table until being delivered to the package storage device. In addition, a limited acceleration for decelerating the package delivering device from moving to stopping is acquired, and when the package delivering device is in decelerating movement, the limited acceleration is negative. In order to avoid collision between all the package delivering devices, the package delivering devices are generally in uniform linear movement at the same speed, and when an obstacle in the front is detected by the package delivering device, the braking distance of the transfer table is calculated according to the delivering time, the limited acceleration and the speed of the uniform linear movement. The braking distance can be smaller than or equal to the length of a delivering zone corresponding to each package storage device, so that the packages are delivered into the package storage device in a process of controlling the transfer table to move along the braking distance, and collision between the package delivering device and an obstacle caused by an overlong braking distance is avoided.

Figure 4:
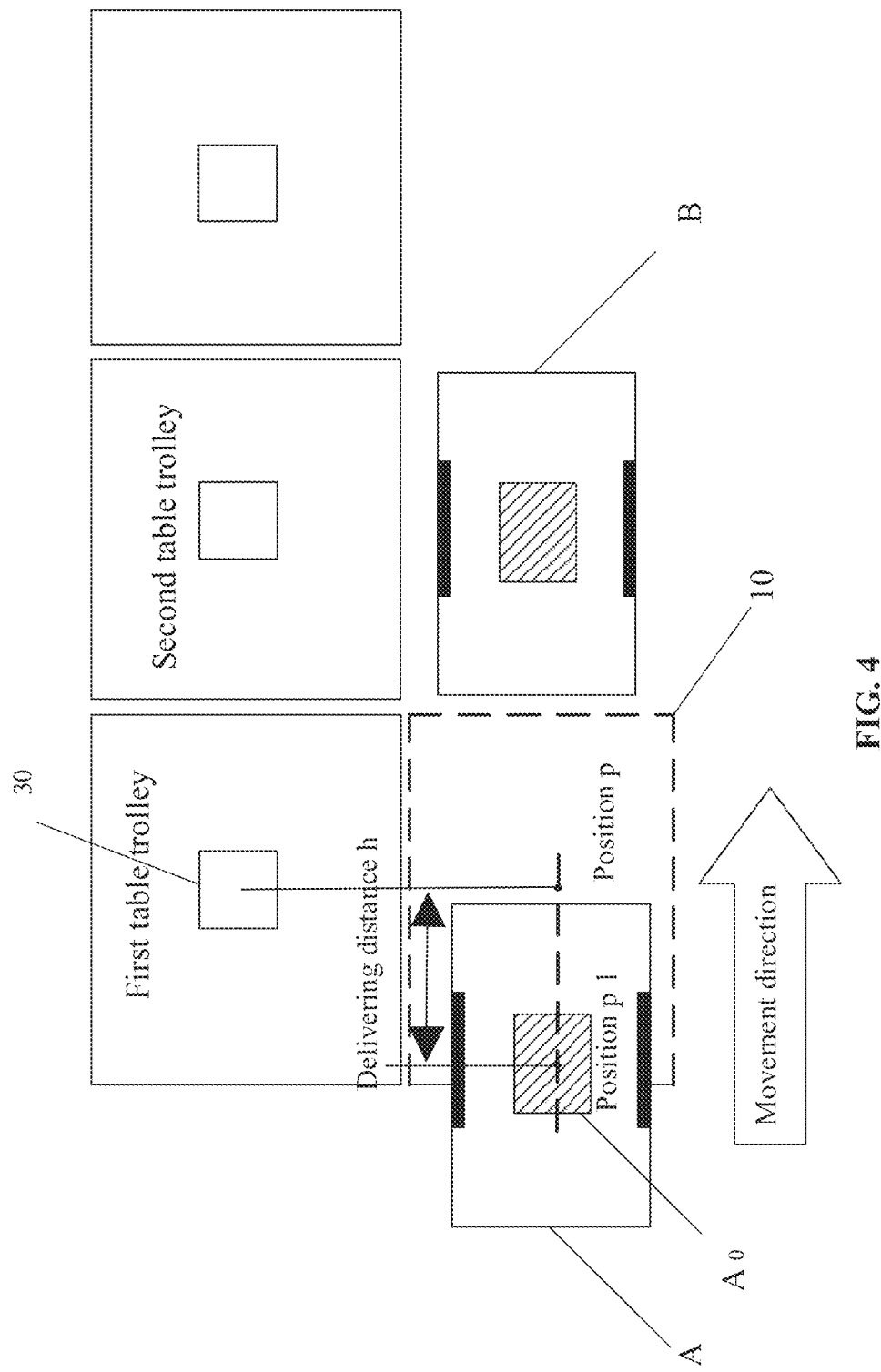
FIG. 4 is a schematic diagram which shows a package sorting robot delivering packages to a cage vehicle in a linear delivering mode according to an embodiment of the present application.
Figure 7:
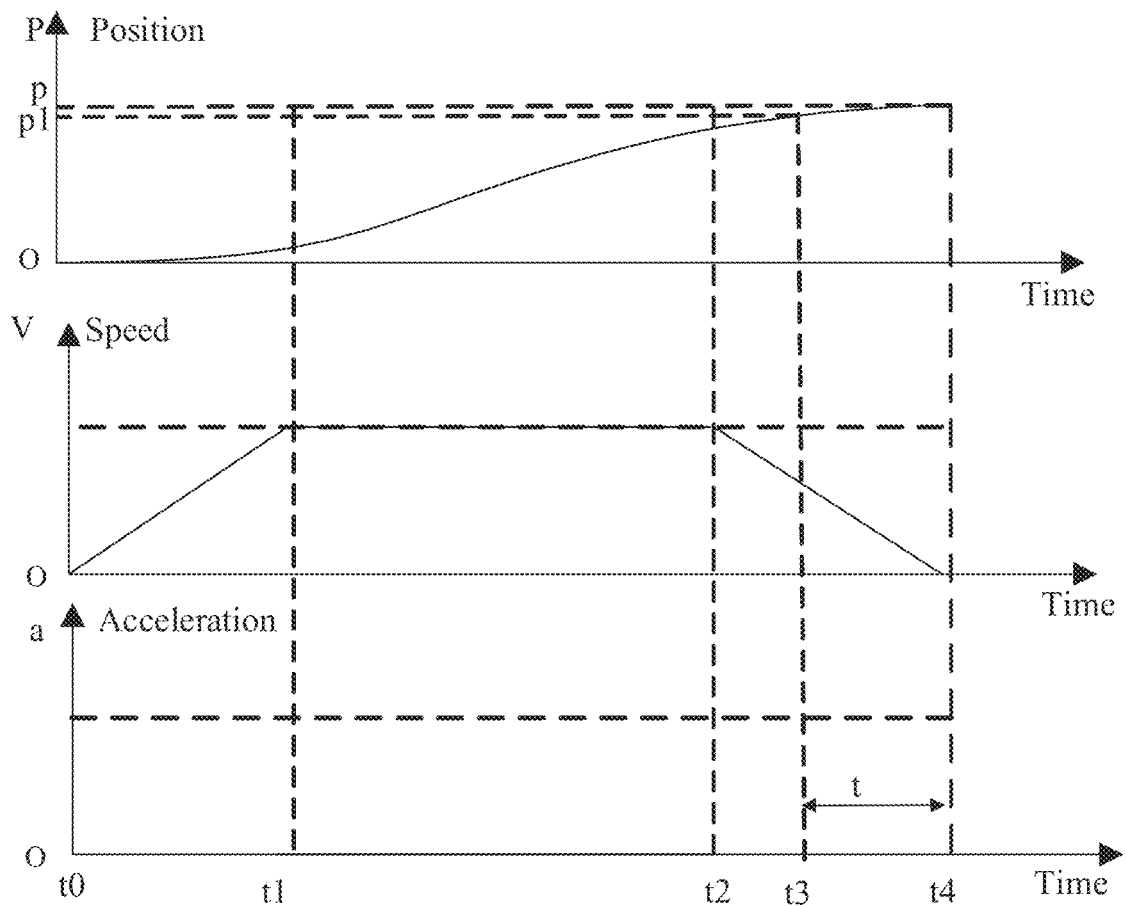
FIG. 7 is a diagram showing the relationship among the movement time t, the delivering time and the position, the speed and the acceleration in the linear delivering mode according to an embodiment of the present application.

For example, as shown in FIG. 4, the package sorting robot A moves to a target position p in the target delivering zone, which may be the position of the two-dimensional code 30 on the underside of the first cage vehicle. The relationship between the delivering time t and the position of the package sorting robot A has been planned in advance, as shown in FIG. 7. According to the delivering time t, the position p1 at which the package sorting robot A starts delivering packages can be calculated, and when a distance between the package sorting robot A and the target position p satisfies h=p−p1 (h is the delivering distance), the transfer belt on the transfer table begins to be started, the execution of the delivering instruction does not affect the execution of the moving instruction of the package sorting robot A, so that the whole delivering process is in a moving state, and thus the efficiency can be effectively improved, and meanwhile, the interference of the malfunctioning package sorting robot B on delivering the packages is avoided.

Figure 5:
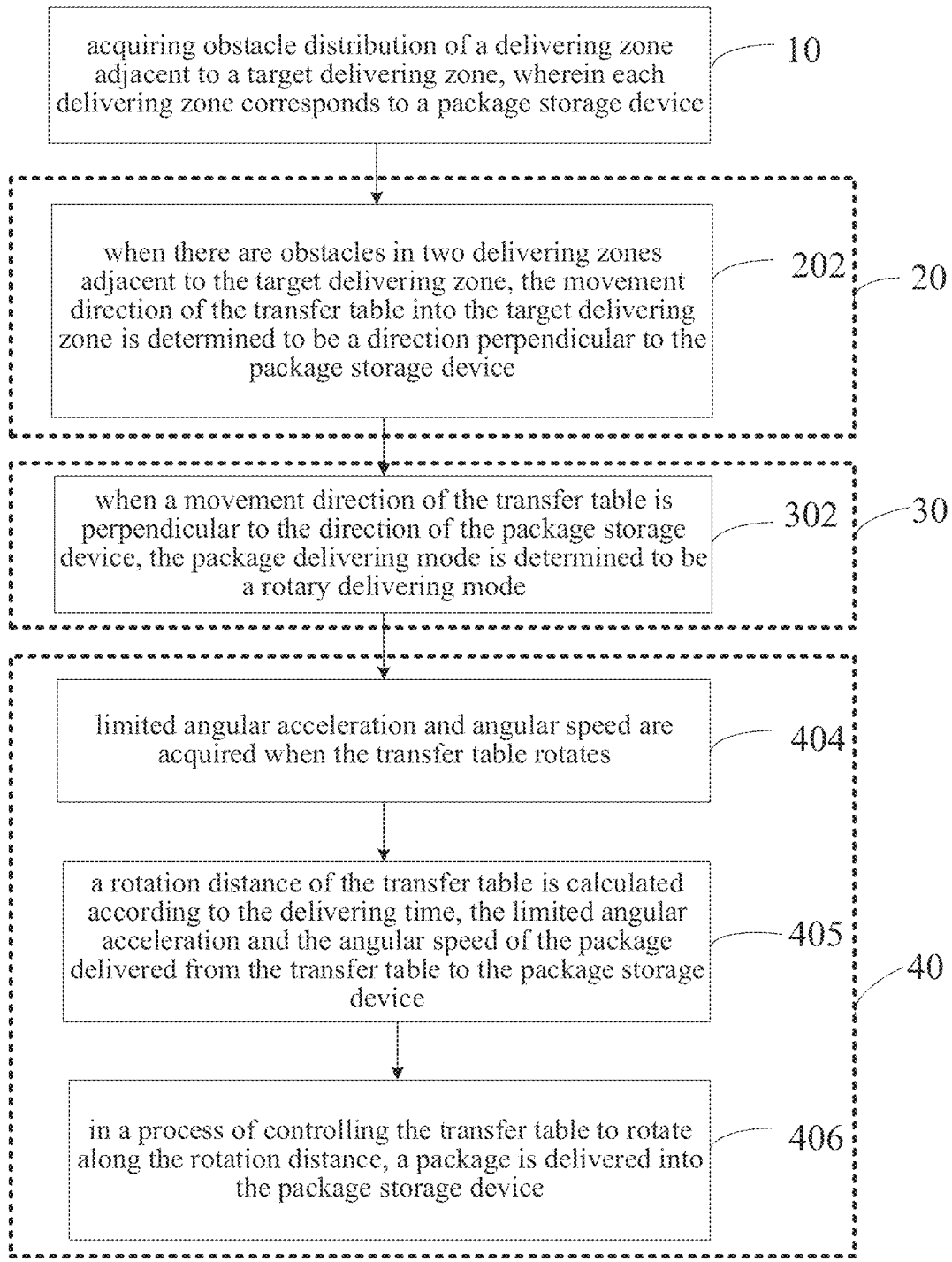
FIG. 5 is a schematic flow diagram of another package delivering method according to an embodiment of the present application.

In an embodiment, as shown in FIG. 5, S20 may include:

S202: in a case that there are obstacles in two delivering zones adjacent to the target delivering zone, determining the movement direction of the transfer table entering the target delivering zone to be a direction perpendicular to the package storage device.

In an example, to facilitate determination of a package delivering mode, the movement direction of a package sorting robot provided with a transfer table is determined when an obstacle is detected. If an obstacle is detected by the package sorting robot in two adjacent delivering zones of the target delivering zone, the package sorting robot moves in a direction perpendicular to the direction of the package storage device so as to conveniently enter a target delivering zone. As shown in FIG. 2, a fifth cage vehicle corresponds to the target delivering zone, and the fifth cage vehicle is adjacent to a third cage vehicle and a fourth cage vehicle, and the delivering zone corresponding to the third cage vehicle and the delivering zone corresponding to the fourth cage vehicle are two delivering zones adjacent to the target delivering zone. The package sorting robot A moves in a direction perpendicular to the row in which the fifth cage vehicle is located.

In an embodiment, as shown in FIG. 5, S30 may include:

S302: in a case that the movement direction of the transfer table is the direction perpendicular to the package storage device, determining the package delivering mode to be a rotary delivering mode.

In an example, a rotary delivering mode means that a package sorting robot provided with a transfer table is located in a delivering zone corresponding to a package storage device, and the packages are delivered while the transfer table is rotating. The problem that the package delivering device cannot enter the target delivering zone for delivering when obstacles are occurred on two sides of the target delivering zone is solved, and meanwhile, the package delivering device moves while rotating the transfer table to deliver the package into the package storage device in the target delivering zone.

In an embodiment, as shown in FIG. 5, S40 may include:

S404: acquiring a limited angular acceleration and an angular speed of the transfer table when the transfer table rotates;

S405: calculating a rotation distance of the transfer table according to the delivering time of the package delivered from the transfer table to the package storage device, the limited angular acceleration and the angular speed; and S406: delivering the package into the package storage device, during controlling the transfer table to rotate along the rotation distance.

In this example, when the package delivering device enters the target delivering zone, in order to avoid collision with obstacles on two sides, it usually chooses to enter the target delivering zone at the center of a long side of the package storage device. After the package delivering device enters the target delivering zone, as the space of the target delivering zone is limited, in order to avoid collision with obstacles on two sides when the package delivering device moves in the target delivering zone, the package can be delivered by rotating the transfer table. Meanwhile, in order to save the delivering time and improve the delivering efficiency, the transfer table can be rotated with the packages being delivered into the package storage device.

The delivering time may indicate the time of all packages on the transfer table moving to an edge of the transfer table until being delivered to the package storage device. In addition, the limited angular acceleration and the angular speed may be acquired when the transfer table of the package delivering device rotates, and it is to be noted that the limited acceleration which is accelerated from a static state to rotate at a stable angular speed is positive, and the limited acceleration which is decelerated from a moving state to a stop state is negative. The packages can be delivered in an accelerating process or in a decelerating process, and can be adaptively adjusted according to actual conditions.

Figure 6:
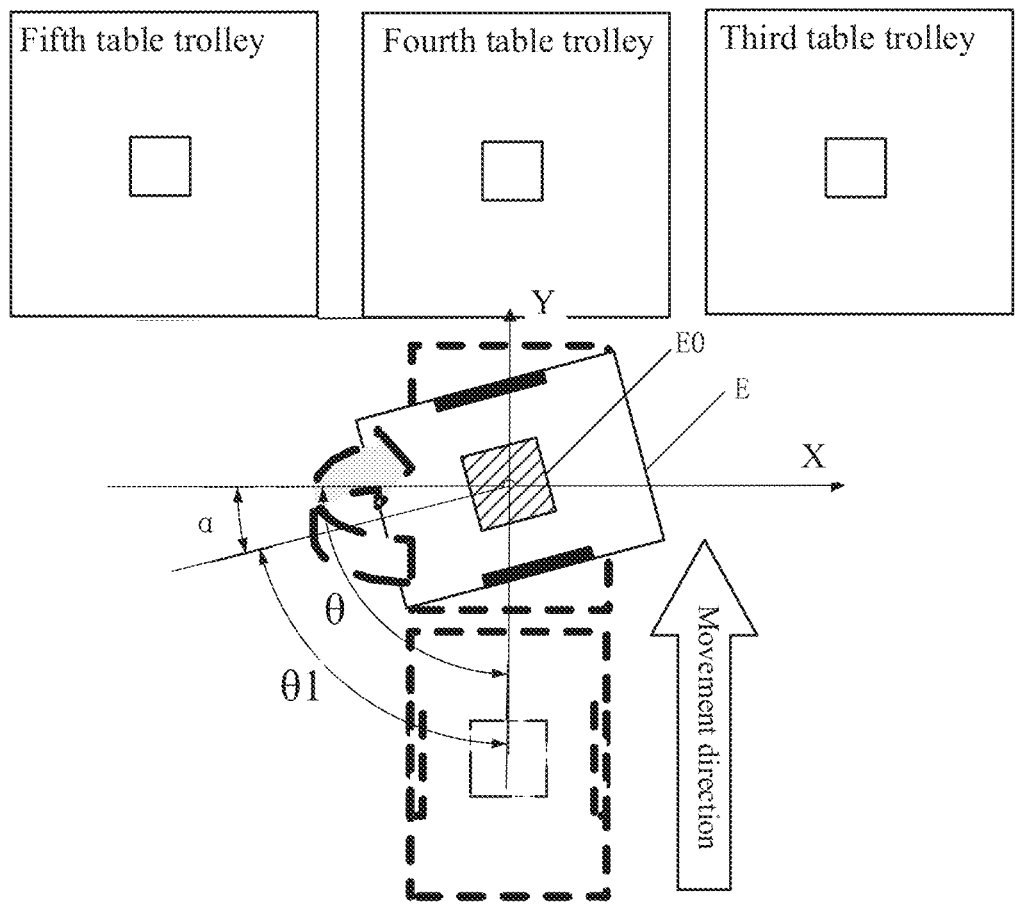
FIG. 6 is a schematic view of a package sorting robot delivering packages to a cage vehicle in a rotary delivering mode according to an embodiment of the present application.
Figure 8:
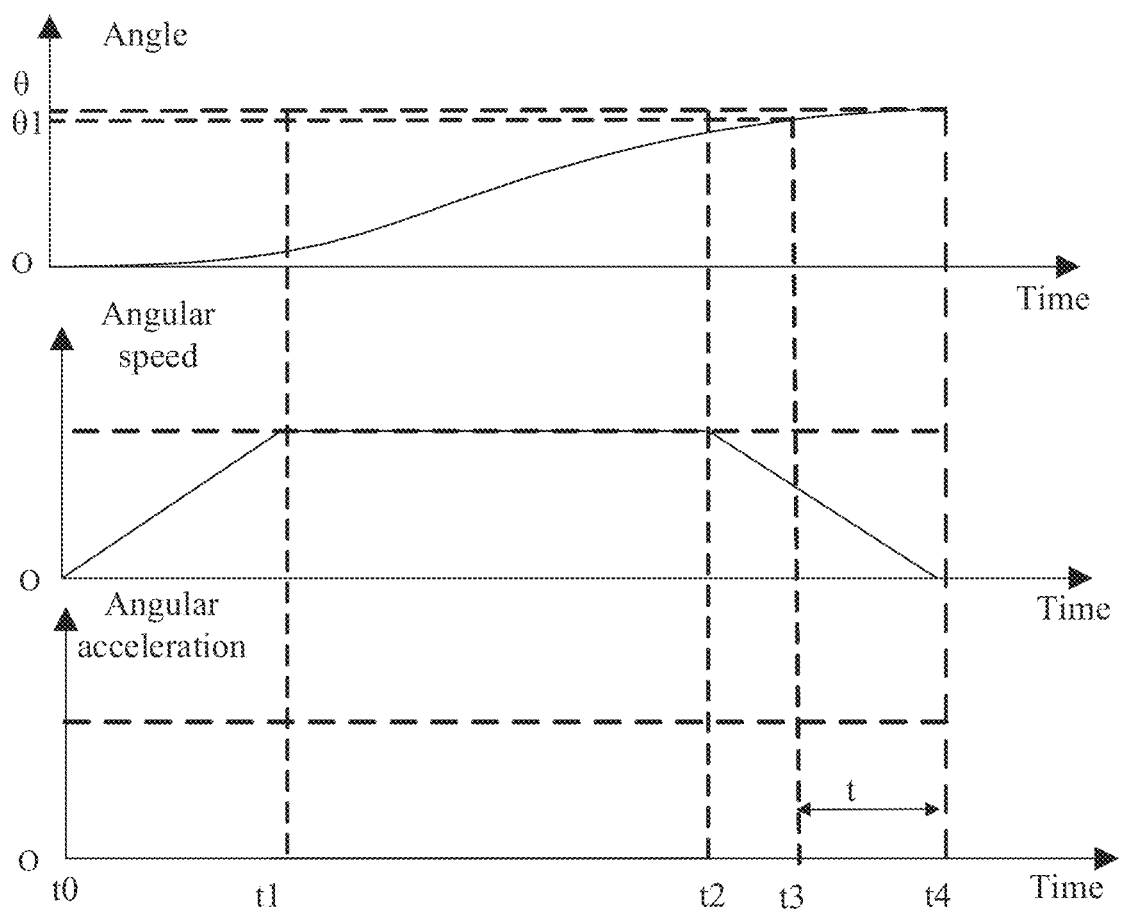
FIG. 8 is a schematic diagram showing the relationship among the rotation time t, the delivering time and the angle, the angular speed and the angular acceleration in the rotary delivering mode according to an embodiment of the present application.

For example, as shown in FIG. 6, a package sorting robot E moves to a side of a fifth cage vehicle in a direction perpendicular to the direction of the row in which the fifth cage vehicle is located, and the belt movement direction of the transfer table on the package sorting robot E is parallel to the direction of the row in which the fifth cage vehicle is located, and thus, in order to align the belt movement direction with the package storage device, the transfer table needs to be rotated 90 degrees to be perpendicular to the direction of the row in which the fifth cage vehicle is located, to effectively deliver the packages. The delivering mode that the package sorting robot E moves while rotating the belt not only saves time and improves delivering efficiency, but also avoids the influence of obstacles in the delivering zone corresponding to the fourth cage vehicle and obstacles in the delivering zone corresponding to the fifth cage vehicle on delivery. During the rotation of the transfer table, the relationship between the delivering time t and the rotation angle has been planned in advance, as shown in FIG. 8. In the same way, according to the delivering time t calculated by the above formula, an angle θ1 of the package sorting robot E at the corresponding time can be calculated, and the belt pulley is started when the angle α of the package sorting robot E away from the target point may be α=θ−θ1, so that the belt moves and the packages are delivered. Meanwhile, in order to save the delivering time and improve the delivering efficiency, the transfer table may be rotated with the packages being delivered into the package storage device.

In an embodiment, the delivering time of the package delivered from the transfer table to the package storage device may be acquired by:

detecting whether the package enters the transfer table or not, if so, transferring the package having entered the transfer table to a delivering position on the transfer table, at a transfer speed;

measuring a vertical distance between the delivering position and the package storage device; and calculating the delivering time according to the transfer speed and the vertical distance.

In an example, due to dispersion of the packages, the packages having entered the transfer table may be first concentrated at a fixed delivering position on the transfer table. The delivering position may be designed at the central zone of the transfer table, but may also be at other positions of course, and it may be adjusted according to actual requirements. Whether a package enters the transfer table or not can be detected by a sensor, and whether a package having entered the transfer table is transferred to the delivering position or not can be detected by the other sensor, and then the delivering time is calculated according to the transfer speed of the transfer table as well as the vertical distance between the delivering position and the package storage device.

Embodiment 2

Figure 9:
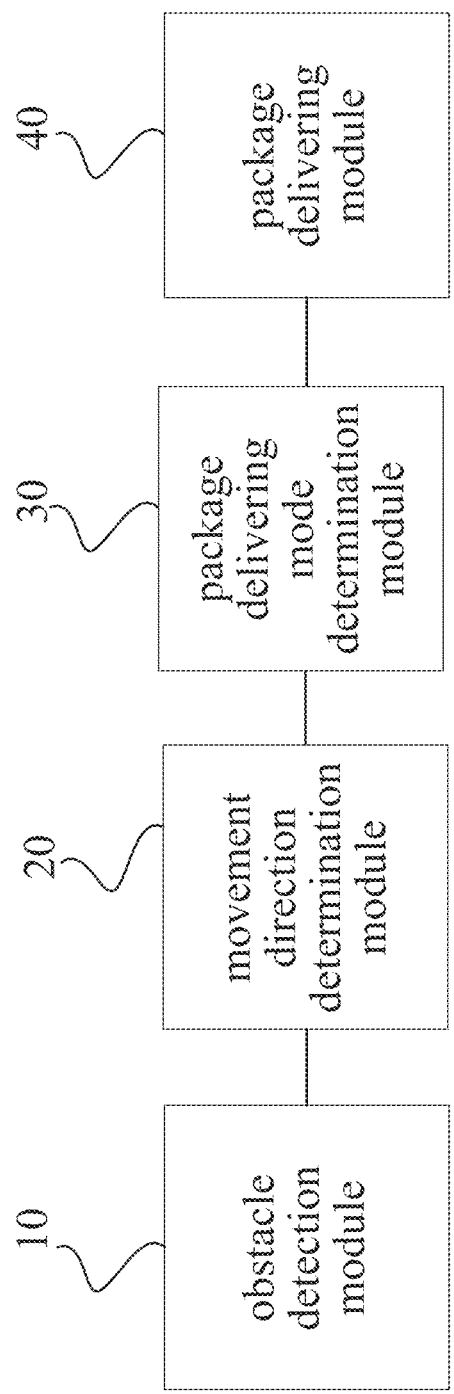
FIG. 9 is a block diagram of a package delivering control device according to an embodiment of the present application.

The embodiment provides a package delivering control device. As shown in FIG. 9, the package delivering control device may include:

an obstacle detection module 10 configured for acquiring an obstacle distribution of a delivering zone adjacent to a target delivering zone, wherein each delivering zone corresponds to a package storage device;

a movement direction determination module 20 configured for determining a movement direction of the transfer table entering the target delivering zone according to the obstacle distribution;

a package delivering mode determination module 30 configured for determining a package delivering mode according to the movement direction of the transfer table; and a package delivering module 40 configured for delivering the package to the package storage device corresponding to the target delivering zone according to the determined package delivering mode.

The package delivering control device may include a processor and a memory, wherein, the memory may be configured to store a program that supports the package delivering control device to execute the package delivering method according to one of the above embodiments, the processor may be configured to execute the program stored in the memory. The package delivering control device may also include a communication interface for communication between the package delivering control device and other devices or communication networks.

Figure 10:
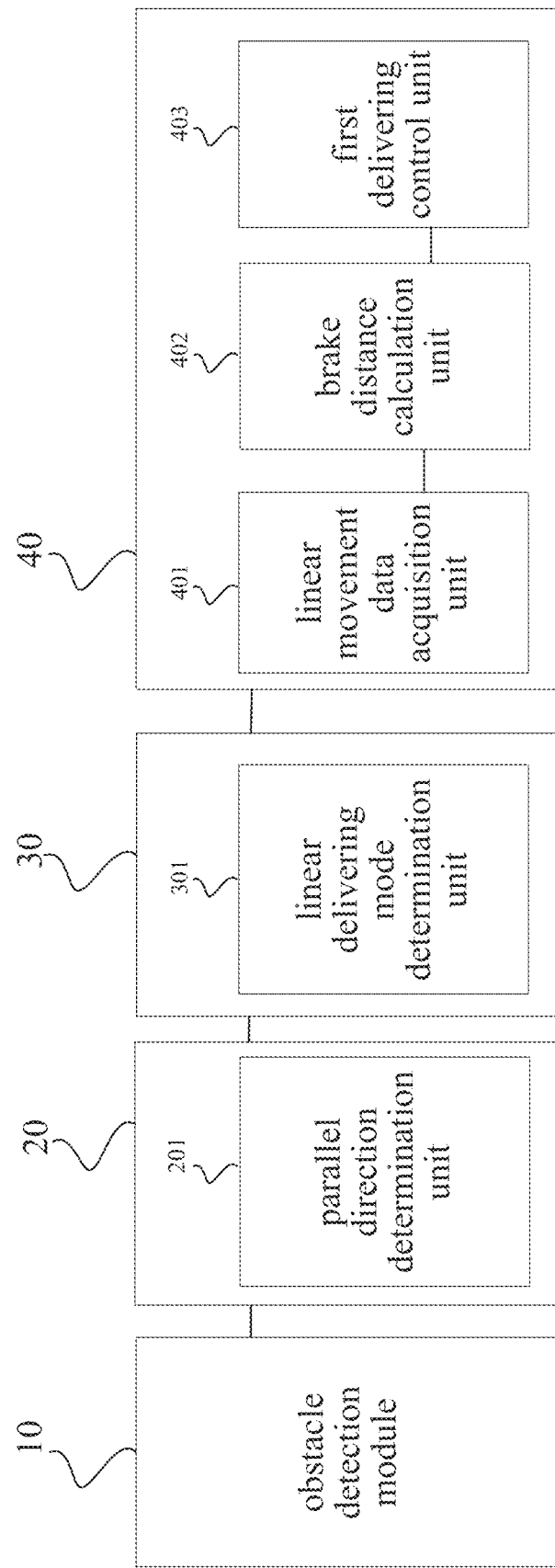
FIG. 10 is a block diagram of another package delivering control device according to an embodiment of the present application.

In an embodiment, as shown in FIG. 10, a movement direction determination module 20 may include:

a parallel direction determination unit 201 configured for determining the movement direction of the transfer table entering the target delivering zone to be a direction parallel to the package storage device in a case that there is an obstacle in one of the delivering zones adjacent to the target delivering zone.

In an embodiment, as shown in FIG. 10, a package delivering mode determination module 30 may include:

a linear delivering mode determination unit 301 configured for determining the package delivering mode to be a linear delivering mode in a case that the movement direction of the transfer table is the direction parallel to the package storage device.

In an embodiment, as shown in FIG. 10, a package delivering module 40 may include:

a linear movement data acquisition unit 401 configured for acquiring a limited acceleration and a speed of the transfer table when the transfer table moves linearly;

a braking distance calculation unit 402 configured for calculating a braking distance of the transfer table according to a delivering time of the package delivered from the transfer table to the package storage device, the limited acceleration and the speed; and a first delivering control unit 403 configured for delivering the package into the package storage device during controlling the transfer table to move along the braking distance.

Figure 11:
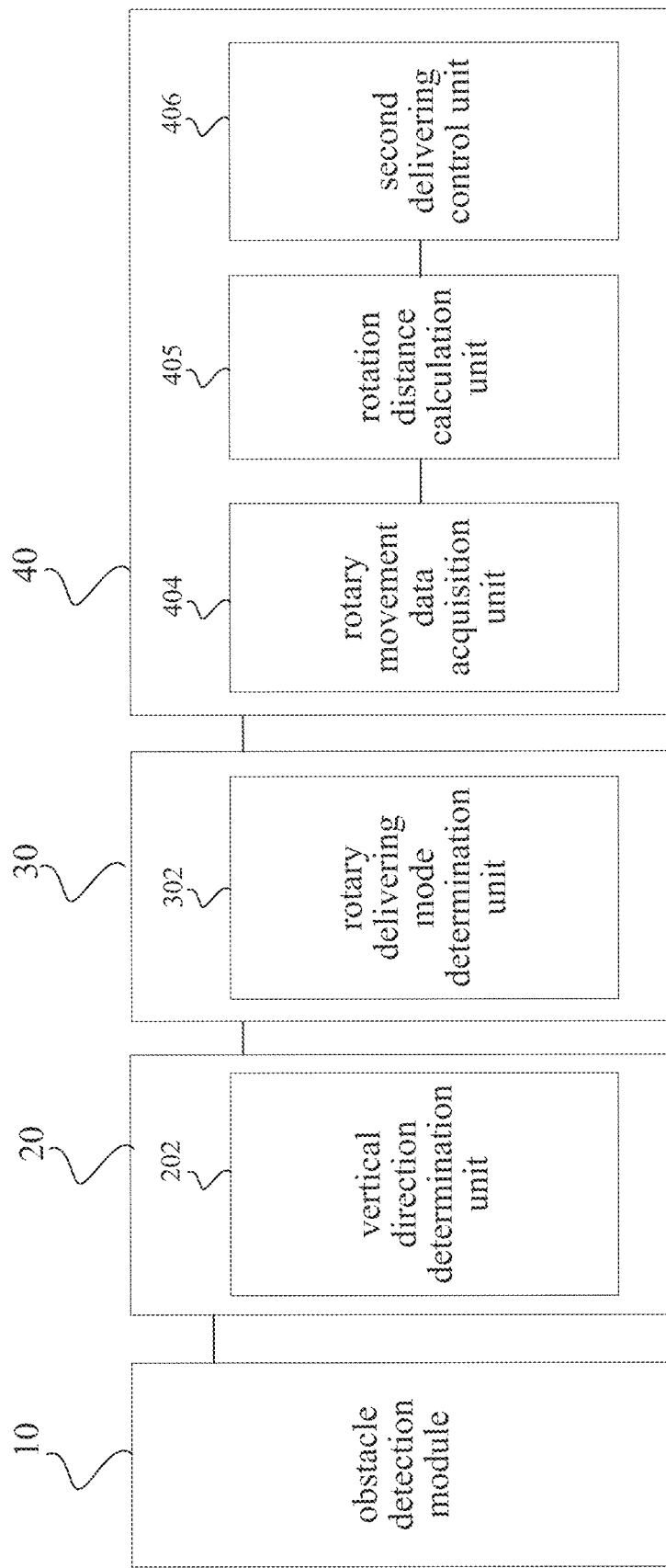
FIG. 11 is a block diagram of another package delivering control device according to an embodiment of the present application.

In an embodiment, as shown in FIG. 11, a movement direction determination module 20 may include:

a vertical direction determination unit 202 configured for determining the movement direction of the transfer table entering the target delivering zone to be a direction perpendicular to the package storage device, in a case that there are obstacles in two delivering zones adjacent to the target delivering zone.

In an embodiment, a package delivering mode determination module 30 may further include:

the rotary delivering mode determination unit 302 configured for determining the package delivering mode to be a rotary delivering mode, in a case that the movement direction of the transfer table is the direction perpendicular to the package storage device.

In an embodiment, as shown in FIG. 11, the package delivering module 40 may further include:

a rotary movement data acquisition unit 404 configured for acquiring a limited angular acceleration and an angular speed of the transfer table when the transfer table rotates;

a rotation distance calculation unit 405 configured for calculating a rotation distance of the transfer table according to the delivering time of the package delivered from the transfer table to the package storage device, the limited angular acceleration and the angular speed; and a second delivering control unit 406 configured for delivering the package into the package storage device during controlling the transfer table to rotate along the rotation distance.

In an embodiment, the package delivering module may further include:

a first sensor arranged at a feeding port of the transfer table and configured for detecting whether the package enters the transfer table;

a second sensor arranged at the delivering position on the transfer table and configured for detecting whether the package enters the delivering position;

a package transfer controller configured for transferring the package having entered the transfer table to the delivering position at a transfer speed;

a measurer configured for measuring a vertical distance between the delivering position and the package storage device; and a delivering time calculator configured for calculating the delivering time according to the transfer speed and the vertical distance.

Embodiment 3

Figure 12:
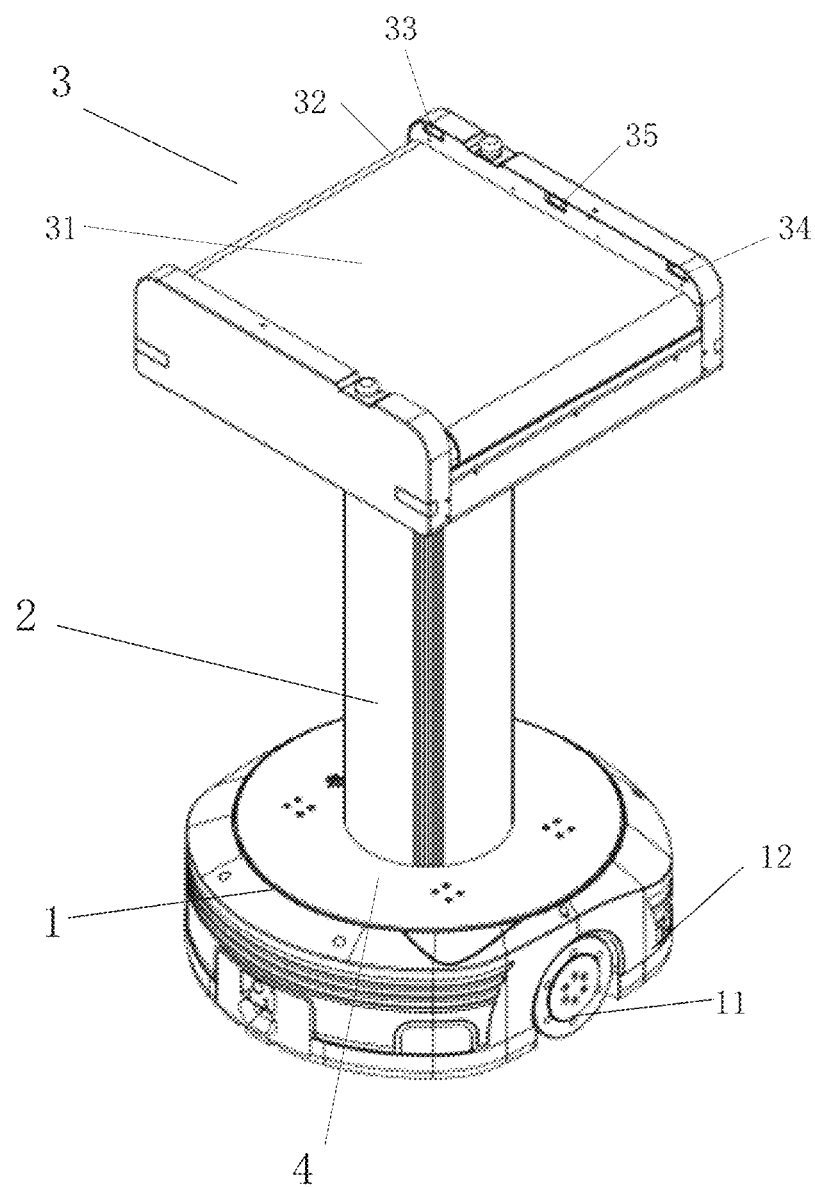
FIG. 12 is a block diagram of a package delivering apparatus according to an embodiment of the present application.

In an example, a package delivering apparatus is also provided. As shown in FIG. 12, the package delivering apparatus may include a moving base 1, a stand column 2 and a transfer table 3, the upper and lower ends of the stand column 2 being connected to the transfer table 3 and the moving base 1, respectively, and a package delivering control device 4, which may be a chip, mounted on an upper surface of the moving base 1. The moving base 1 may be configured for bearing the transfer table 3 to move, the moving base 1 may include a driving wheel 11 and a driven wheel 12, the driving wheel is configured for providing power for the movement of the trolley, and the driven wheel is configured for supporting the chassis to be parallel to the ground. The moving base 1 may be an AGV (Automated Guided Vehicle) vehicle. The transfer table 3 may include a belt pulley 31 and a belt motor 32, and a package can be adjusted to an intermediate delivering position by moving the belt when the package enters into the belt pulley 31. There may be provided with three infrared sensors on the belt pulley 31, and two infrared sensors among them are respectively arranged at two ends of the belt movement direction and configured for detecting whether the package enters the transfer table, and the two infrared sensors may be a first infrared sensor 33 and a second infrared sensor 34 respectively. A third infrared sensor 35 may be provided at the delivering position, configured for detecting whether the package is delivered to the delivering position. Preferably, the delivering position may be designed to be at the center of the belt pulley.

In the description of this specification, reference to the description of the terms "an embodiment", "some embodiments", "an example", "particular examples", or "some examples", etc., means that a particular feature, structure, material, or characteristic described in connection with the embodiment or example is included in at least an embodiment or example of the application. Furthermore, the particular features, structures, materials, or characteristics described may be combined in any one or more embodiments or examples in a suitable manner. Moreover, various embodiments or examples described in this specification, as well as features of various embodiments or examples, may be integrated and combined by a person skilled in the art without departing from the scope of the disclosure.

Furthermore, the terms "first" and "second" are configured for descriptive purposes only and are not to be construed as indicating or implying relative importance or implicitly indicating the number of technical features indicated. Thus, features defining "first" and "second" may explicitly or implicitly include at least one such feature. In the description of the application, "a plurality of" refers to two or more unless specifically defined otherwise.

Any process or method descriptions in flow diagrams or otherwise described herein may be understood to represent modules, segments, or portions of code including one or more executable instructions for implementing the steps of a particular logical function or process, and the scope of the preferred embodiments of the present application may include additional implementations, which may not be in the order shown or discussed, including performing functions in a substantially simultaneous manner or in a reverse order according to the functions involved should be understood by a person skilled in the art to which the embodiments of the present application pertain.

The logic and/or steps represented in the flowcharts or otherwise described herein, such as an ordered listing of executable instructions that can be considered to implement logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. For the purposes of this specification, a "computer-readable medium" can be any means that can contain, store, communicate, propagate, or transport the program for use by or in connection with the instruction execution system, apparatus, or device. More specific examples (a non-exhaustive list) of the computer-readable medium include the following: an electrical connection (electronic device), a portable computer cartridge (magnetic device), a random access memory (RAM), a read-only memory (ROM), an erasable programmable read-only memory (EPROM or Flash memory), an optical fiber device, and a portable read-only memory (CDROM) having one or more wiring lines. In addition, the computer-readable medium may even be paper or other suitable medium upon which the program is printed, as the program may be electronically obtained, such as by optically scanning the paper or other medium, followed by editing, interpreting, or otherwise processing in a suitable manner if necessary, and then stored in a computer memory.

It is to be understood that portions of the present application may be implemented in hardware, software, firmware, or a combination thereof. In the embodiments described above, the steps or methods may be implemented in software or firmware stored in memory and executed by a suitable instruction execution system. For example, if implemented in hardware, as in another embodiment, it may be implemented using any one or a combination of the following techniques known in the art: discrete logic circuits with logic gates for implementing logic functions on data signals, application specific integrated circuits with appropriate combinational logic gates, programmable gate arrays (PGAs), field programmable gate arrays (FPGAs), etc.

It will be appreciated by a person skilled in the art that all or a portion of the steps carried by a method of implementing the above-described embodiments may be performed by program instructions associated with hardware, which may be stored in a computer-readable storage medium, which when executed, may include one or a combination of the steps of the method embodiments.

Furthermore, the functional units in the various embodiments of the present application may be integrated in one processing module, may be physically separate units, or may be integrated in one module in two or more units. The integrated module can be realized in the form of hardware or software functional modules. The integrated module, if implemented in the form of a software functional module and sold or used as a stand-alone product, may also be stored in a computer-readable storage medium. The storage medium may be a read-only memory, a magnetic or optical disk, or the like.

The above description is only a particular embodiment of the present application, but the scope of protection of the present application is not limited thereto, and various changes or substitutions thereof will readily occur to a person skilled in the art within the scope of the present disclosure, and these are intended to be within the scope of protection of the present application. Therefore, the scope of protection of this application should be determined by the scope of protection of the claims.

What is claimed is:

1. A package delivering method, comprising:
   acquiring an obstacle distribution of a delivering zone adjacent to a target delivering zone, wherein each delivering zone corresponds to a corresponding package storage device;
   determining a movement direction of a transfer table entering the target delivering zone according to the obstacle distribution, wherein the transfer table is used for delivering a package into a package storage device;
   determining, by a computer-based system, a package delivering mode according to the movement direction of the transfer table; and
   delivering, by the transfer table, the package into the package storage device corresponding to the target delivering zone according to the determined package delivering mode;
   wherein determining the movement direction of the transfer table entering the target delivering zone according to the obstacle distribution, comprises:
   determining that there is an obstacle in one of the delivering zones adjacent to the target delivering zone and there is no obstacle in the other zone of the delivering zones adjacent to the target delivering zone, and then, in response, determining the movement direction of the transfer table entering the target delivering zone to be a direction parallel to the package storage device.

2. The method of claim 1, wherein the determining the package delivering mode according to the movement direction of the transfer table, comprises:
   in a case that the movement direction of the transfer table is the direction parallel to the package storage device, determining the package delivering mode to be a linear delivering mode.

3. The method of claim 2, wherein delivering the package into the package storage device according to the determined package delivering mode, comprises:
   acquiring a limited acceleration and a speed of the transfer table when the transfer table moves linearly;
   calculating a braking distance of the transfer table, according to a delivering time of the package delivered from the transfer table to the package storage device, the limited acceleration and the speed; and
   delivering the package into the package storage device during controlling the transfer table to move along the braking distance.

4. The method of claim 3, wherein the delivering time of the package delivered from the transfer table to the package storage device is acquired by:
   detecting that the package enters the transfer table, and transferring the package having entered the transfer table to a delivering position on the transfer table, at a transfer speed;
   measuring a vertical distance between the delivering position and the package storage device; and
   calculating the delivering time according to the transfer speed and the vertical distance.

5. The method of claim 1, wherein, for a separate package delivery, determining the movement direction of the transfer table entering the target delivering zone according to the obstacle distribution, comprises:
   determining that there are obstacles in two delivering zones adjacent to the target delivering zone, and then, in response, determining the movement direction of the transfer table entering the target delivering zone to be a direction perpendicular to the package storage device.

6. The method of claim 5, wherein, for the separate package delivery, the determining the package delivering mode according to the movement direction of the transfer table, comprises:
in a case that the movement direction of the transfer table is the direction perpendicular to the package storage device, determining the package delivering mode to be a rotary delivering mode.

7. The method of claim 6, wherein, for the separate package delivery, delivering the package into the package storage device according to the determined package delivering mode, comprises:
acquiring a limited angular acceleration and an angular speed of the transfer table when the transfer table rotates;
calculating a rotation distance of the transfer table, according to a delivering time of the package delivered from the transfer table to the package storage device, the limited angular acceleration and the angular speed; and
delivering the package into the package storage device during controlling the transfer table to rotate along the rotation distance.

8. A package delivering control device, comprising:
an obstacle detection module, implemented in one or more processors executing instructions stored in one or more computer-readable memory, configured for acquiring an obstacle distribution of a delivering zone adjacent to a target delivering zone, wherein each delivering zone corresponds to a corresponding package storage device;
a movement direction determination module, implemented in the one or more processors executing instructions stored in the one or more computer-readable memory, configured for determining a movement direction of a transfer table entering the target delivering zone according to the obstacle distribution;
a package delivering mode determination module, implemented in the one or more processors executing instructions stored in the one or more computer-readable memory, configured for determining a package delivering mode according to the movement direction of the transfer table; and
a package delivering module, implemented in the one or more processors executing instructions stored in the one or more computer-readable memory, configured for delivering a package, by the transfer table, into a package storage device corresponding to the target delivering zone according to the determined package delivering mode;
wherein the movement direction determination module comprises:
a parallel direction determination unit, implemented in the one or more processors executing instructions stored in the one or more computer-readable memory, configured for determining the movement direction of the transfer table entering the target delivering zone to be a direction parallel to the package storage device in a case that there is an obstacle in one of the delivering zones adjacent to the target delivering zone and there is no obstacle in the other zone of the delivering zones adjacent to the target delivering zone.

9. The package delivering control device of claim 8, wherein the package delivering mode determination module comprises:
a linear delivering mode determination unit, implemented in the one or more processors executing instructions stored in the one or more computer-readable memory, configured for determining the package delivering mode to be a linear delivering mode in a case that the movement direction of the transfer table is the direction parallel to the package storage device.

10. The package delivering control device of claim 9, wherein the package delivering module comprises:
a linear movement data acquisition unit, implemented in the one or more processors executing instructions stored in the one or more computer-readable memory, configured for acquiring a limited acceleration and a speed of the transfer table when the transfer table moves linearly;
a braking distance calculation unit, implemented in the one or more processors executing instructions stored in the one or more computer-readable memory, configured for calculating a braking distance of the transfer table according to a delivering time of the package delivered from the transfer table to the package storage device, the limited acceleration and the speed; and
a first delivering control unit, implemented in the one or more processors executing instructions stored in the one or more computer-readable memory, configured for delivering the package into the package storage device during controlling the transfer table to move along the braking distance.

11. The package delivering control device of claim 10, wherein the package delivering module further comprises:
a first sensor arranged at a feeding port of the transfer table and configured for detecting whether the package enters the transfer table;
a second sensor arranged at a delivering position on the transfer table and configured for detecting whether the package enters the delivering position;
a package transfer controller configured for transferring the package having entered the transfer table to the delivering position at a transfer speed;
a measurer configured for measuring a vertical distance between the delivering position and the package storage device; and
a delivering time calculator configured for calculating the delivering time according to the transfer speed and the vertical distance.

12. The package delivering control device of claim 8, wherein the movement direction determination module comprises:
a vertical direction determination unit, implemented in the one or more processors executing instructions stored in the one or more computer-readable memory, configured for determining the movement direction of the transfer table entering the target delivering zone to be a direction perpendicular to the package storage device, in a case that there are obstacles in two delivering zones adjacent to the target delivering zone.

13. The package delivering control device of claim 12, wherein the package delivering mode determination module further comprises:
a rotary delivering mode determination unit, implemented in the one or more processors executing instructions stored in the one or more computer-readable memory, configured for determining the package delivering mode to be a rotary delivering mode, in a case that the movement direction of the transfer table is the direction perpendicular to the package storage device.

14. The package delivering control device of claim 13, wherein the package delivering module further comprises:
- a rotary movement data acquisition unit, implemented in the one or more processors executing instructions stored in the one or more computer-readable memory, configured for acquiring a limited angular acceleration and an angular speed of the transfer table when the transfer table rotates;
- a rotation distance calculation unit, implemented in the one or more processors executing instructions stored in the one or more computer-readable memory, configured for calculating a rotation distance of the transfer table according to a delivering time of the package delivered from the transfer table to the package storage device, the limited angular acceleration and the angular speed; and
- a second delivering control unit, implemented in the one or more processors executing instructions stored in the one or more computer-readable memory, configured for delivering the package into the package storage device during controlling the transfer table to rotate along the rotation distance.

15. A package delivering apparatus, comprising:
- a moving base, a stand column, a transfer table and a package delivering control device; wherein
- an upper end and a lower end of the stand column are respectively connected with the transfer table and the moving base, and the transfer table is used for delivering a package into a package storage device; and
- the package delivering control device comprises:
- an obstacle detection module, implemented in one or more processors executing instructions stored in one or more computer-readable memory, configured for acquiring an obstacle distribution of a delivering zone adjacent to a target delivering zone, wherein each delivering zone corresponds to a corresponding package storage device;
- a movement direction determination module, implemented in the one or more processors executing instructions stored in the one or more computer-readable memory, configured for determining a movement direction of the transfer table entering the target delivering zone according to the obstacle distribution;
- a package delivering mode determination module, implemented in the one or more processors executing instructions stored in the one or more computer-readable memory, configured for determining a package delivering mode according to the movement direction of the transfer table; and
- a package delivering module, implemented in the one or more processors executing instructions stored in the one or more computer-readable memory, configured for delivering the package, by the transfer table, into the package storage device corresponding to the target delivering zone according to the determined package delivering mode;
- wherein the movement direction determination module comprises:
- a parallel direction determination unit, implemented in the one or more processors executing instructions stored in the one or more computer-readable memory, configured for determining the movement direction of the transfer table entering the target delivering zone to be a direction parallel to the package storage device in a case that there is an obstacle in one of the delivering zones adjacent to the target delivering zone and there is no obstacle in the other zone of the delivering zones adjacent to the target delivering zone.

* * * * *